March 12, 1968 F. M. POTTER 3,372,559

FLEXIBLE DRIVE SHAFT

Filed Feb. 17, 1966

INVENTOR.
FREDERICK M. POTTER
BY James M. Nickels
ATTORNEY 3,372,559
FLEXIBLE DRIVE SHAFT
Frederick Milton Potter, Little Silver, N.J., assignor to The Bendix Corporation, a corporation of Delaware
Filed Feb. 17, 1966, Ser. No. 528,171
5 Claims. (Cl. 64—1)

ABSTRACT OF THE DISCLOSURE

An accessory drive control in which a flexible drive shaft has the characteristics of a shaft twice the length by the provision of outer and inner telescoping members having substantially the same torsional strength.

The present invention relates to accessory apparatus of the type adapted to be driven from a mechanical source such as an aircraft engine and more particularly to a drive shaft arrangement for such a device.

Presently accessory apparatus, for example an aircraft generator, are driven by means of a long torsional shaft that extends through a hollow shaft and connected thereto at the antidrive end with a friction coupling at the drive end. Such an arrangement is disclosed in U.S. Patent No. 2,487,934. However, for some applications it is not possible to have a torsional shaft long enough to provide the desired flexibility.

The present invention provides a novel construction of a drive shaft which will provide the desired flexibility in a relatively short length. A composite shaft is made up of an inner member connected to an outer member at the antidrive end.

It is an object of the invention to orpvide a novel accessory drive shaft.

Another object of the invention is to provide a novel drive shaft for a dynamoelectric machine.

The above and other objects and features of the invention will appear more fully hereinafter from a consideration of the following description taken in connection with the accompanying drawing wherein one example is illustrated by way of example.

Figure 1:
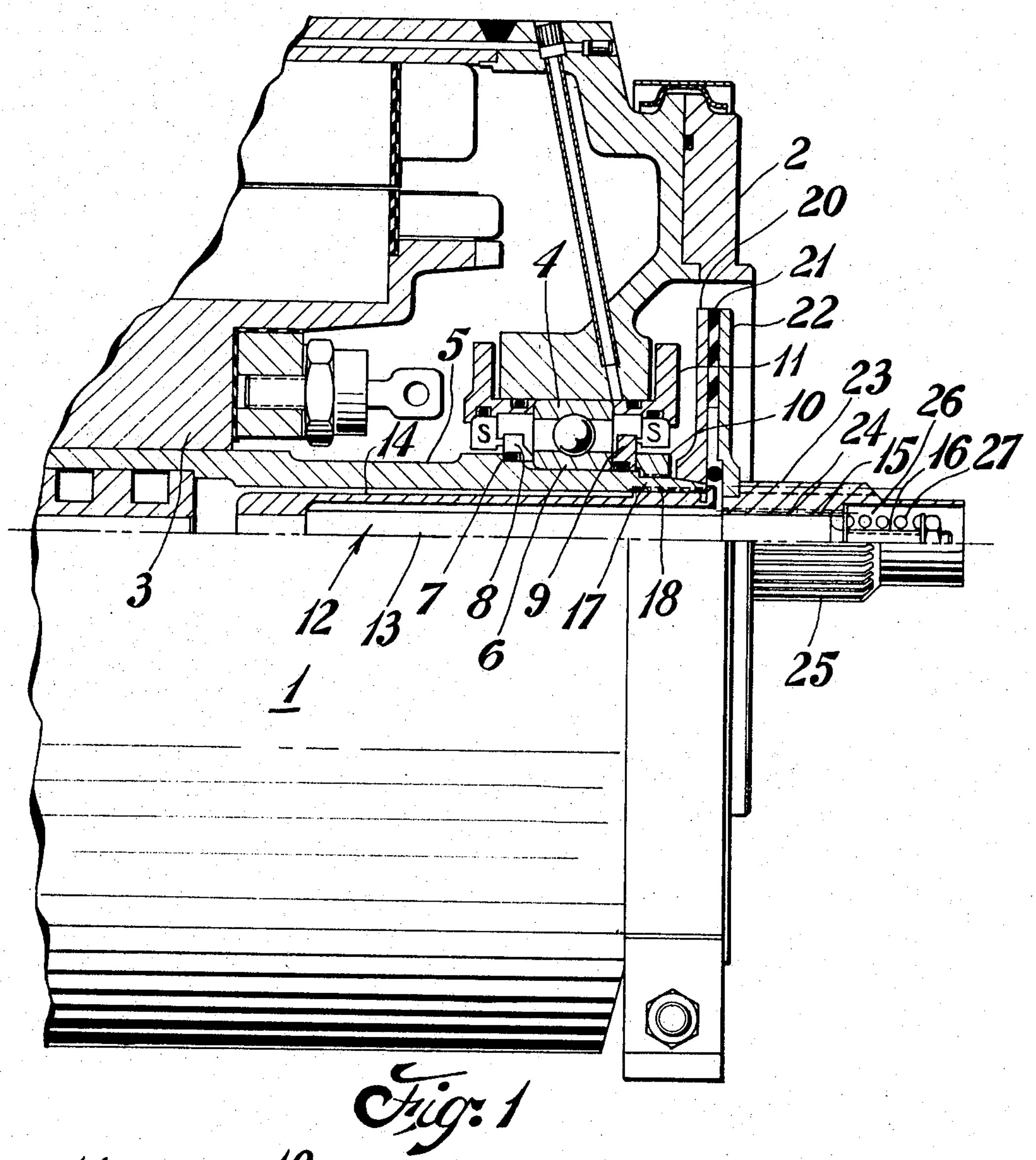
FIGURE 1 is a partial section view of a dynamoelectric machine having a shaft embodying the invention.

Referring now to the drawing wherein a dynamoelectric machine is indicated by the numeral 1, only a portion of the dynamoelectric machine has been illustrated, the remainder has been omitted for simplicity. The dynamoelectric machine 1 has a housing 2 in which an armature 3 is rotatably supported therein by bearings 4, only one being shown. The armature 3 includes a hollow shaft 5 having a restricted portion 6 adapted for a press fit in the bearing 4. The bearing 4 is secured on the shaft by a shoulder 7, on the shaft 5, rings 8 and 9 and bearing retaining nut 10. The bearing 4 is held in the housing 2 by clamps 11.

Figure 2:
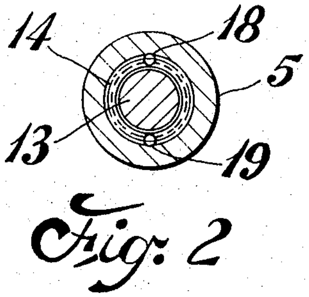
FIGURE 2 is a cross section view along the lines 2—2 of FIGURE 1.

A feature of the invention is a flexible shaft indicated generally by the numeral 12. The shaft 12 has an inner shaft 13 which extends through a thin cylindrical shaft 14 having substantially the same torsional strength and is secured thereto at the antidrive end by brazing or any other suitable manner. The inner shaft 13 has a splined section 15 at the drive end. Also the shaft 13 has an extended threaded section 16 at the drive end. The cylindrical shaft 14 has a threaded section 17 adapted to mate with an internal threaded section 18 in the shaft 5. After the shaft 14 has been threaded into the shaft 5, two holes 18 are drilled 180° apart (see FIGURE 2) on the pitch diameter of the threads 16 and 17 for substantially the length of the threads and dowel pins or "Dutchman" 19 are pressed into the holes 18 to secure the assembly.

A friction damper plate 20 is mounted on the shaft 5 by a self-locking taper fit or other suitable means. A friction brake plate 21 is cemented to the plate 20. A matching plate 22 is secured to a member 23 which has internal splines 24 adapted to mate with the splined section 15 of the shaft 13 and external splines 25 adapted to engage with a prime mover (not shown). The member 23 has a recessed section 26 adapted to receive a spring 27. A nut 28 on the extended section compresses the spring 27 to force the friction plate 22 into engagement with the friction brake plate 21.

Thus the present invention permits the creation of friction damping and flexible drive shaft construction in a relatively small length. Only a portion of the overall length of the machine is required to provide the necessary flexibility and friction damping necessary to withstand torsional oscillations particularly of reciprocating engines. In other words, this arrangement permits a flexible drive shaft that has the characteristics of one twice the length. This becomes an important feature as in some applications it is not possible to have a hollow rotor shaft, as examples, oil cooled rotors and generators where the shaft is utilized to convey the magnetic flux.

Although only one embodiment of the invention has been illustrated and described, various changes in the form and relative arrangement of the parts, which will now appear to those skilled in the art, may be made without departing from the scope of the invention.

What is claimed is:

1. In an accessory device having a housing and a rotatable member mounted therein, the combination comprising an outer shaft, said outer shaft having a recessed section therein, a tubular inner shaft extending longitudinally in said recessed section, means securing said inner shaft to said outer shaft at the open end of said recessed section, a pencil shaft concentric with said inner shaft and extending into said inner shaft, means securing said pencil shaft to said inner shaft at the ends adjacent to the closed end of said recessed section, said tubular inner shaft and said pencil shaft having substantially the same torsional strength, a vibration damper connecting said pencil shaft and said outer shaft, and bearing means mounting said outer shaft in said housing.

2. The combination as set forth in claim 1 in which said accessory device is a dynamoelectric machine.

3. The combination as set forth in claim 1 in which said tubular inner shaft is secured in said outer shaft by a threaded section on both shafts, and dowel pins inserted through said threaded section to lock said shafts together.

4. The combination as set forth in claim 1 in which said vibration damper is biased by a spring positioned on an extension of said pencil shaft.

5. The combination as set forth in claim 1 in which a splined member is adapted for engagement with splines on said pencil shaft.

References Cited

UNITED STATES PATENTS

| | | | |
|---|---|---|---|
| 2,437,954 | 3/1948 | Havill | 64—1 |
| 2,476,894 | 7/1949 | Mulheim | 64—1 |
| 2,487,934 | 11/1949 | Mastropole | 64—1 X |
| 2,550,580 | 4/1951 | McLeon | 64—1 X |

FOREIGN PATENTS

| | | |
|---|---|---|
| 617,132 | 2/1949 | Great Britain. |

HALL C. COE, *Primary Examiner.*